United States Patent [19]

Tremp

[11] 4,290,571
[45] Sep. 22, 1981

[54] HANGER DEVICE, PARTICULARLY FOR PIPELINES IN BUILDINGS

[75] Inventor: Walter Tremp, Schänis, Switzerland

[73] Assignee: Schlossfabrik Schulte & Co., Switzerland

[21] Appl. No.: 39,828

[22] Filed: May 17, 1979

[30] Foreign Application Priority Data

Aug. 30, 1978 [CH] Switzerland .................. 9135/78
Apr. 5, 1979 [CH] Switzerland .................. 3175/79

[51] Int. Cl.³ .................................... E21F 17/02
[52] U.S. Cl. ................................ 248/59; 248/327
[58] Field of Search ........................... 248/320–322, 248/58–66, 327–329; 254/155

[56] References Cited

U.S. PATENT DOCUMENTS

| | | | |
|---|---|---|---|
| 1,000,045 | 8/1911 | Spicer | 248/330.1 X |
| 2,780,429 | 2/1957 | Vanier | 248/59 |
| 3,517,901 | 6/1970 | Jenkins | 248/327 X |
| 3,667,709 | 6/1972 | Linser | 248/59 |

FOREIGN PATENT DOCUMENTS

174257 9/1906 Fed. Rep. of Germany ...... 248/329
2622432 5/1977 Fed. Rep. of Germany ........ 248/59

*Primary Examiner*—J. Franklin Foss
*Attorney, Agent, or Firm*—Ostrolenk, Faber, Gerb & Soffen

[57] ABSTRACT

The disclosure concerns a hanger device for suspending a pipeline, or the like. It includes a stationary housing adapted to be attached to a support. A rotatable roll is supported in the housing. Engageable teeth are supported by the roll and rotate therewith. A plate-thin lock is supported on the housing. The plate has a C-shape and the roll is positioned in the cutout of the C. The internal wall of the opening of the C is toothed at the top. The lock is shiftable with respect to the housing so that under the weight of the lock, the lock settles and the teeth of the lock mate with the roll teeth and prevent further rotation of the roll. The lock can be raised to separate the teeth, permitting the roll to be rotated. A hanger is windable on the roll, whereby winding of the roll adjusts the height of the object supported by the hanger.

16 Claims, 4 Drawing Figures

HANGER DEVICE, PARTICULARLY FOR PIPELINES IN BUILDINGS

BACKGROUND OF THE INVENTION

The present invention relates to a hanger device, particularly for suspending pipelines in buildings. Such hanger device includes a rolling-up means for rolling up and lowering the hanger of the hanger device. The rolling-up means includes a rotatable roll which is rotatably supported in a housing. The housing can be attached stationary to a support. First mating means or gripping means comprising a toothed ratchet cooperates with second mating means comprising mating teeth of a lock to lock the roll against rotation. The hanger device further includes a band or wire hanger having one end attached to the roll and the other end for supporting a pipe, or the like.

In one such hanger device, a steel band hanger is used. It is provided with thread toothing. The hanger is bent at its bottom into a loop and the loop is held by means of a fastener. The upper free end of the hanger extends into a rolling-up device. This has been used, for instance, in hose clamps (Müpro-Fix System).

In a similar hanger device, rolling-up means is employed which corresponds to the construction of a wire tensioner. It includes a winding-up roll which is radially displaceable. In its lowered position, the roll includes lock toothing that engages mating toothing in the supporting housing for the roll. This has the disadvantage that for adjusting of the desired length of the band or for adjusting the height of the pipe, which adjustment involves turning the roll, the roll must continuously also be uselessly lifted to disengage the lock. This is bothersome to installers, especially those who work on ladders or scaffolds (Fäster System).

In so-called Flamco pendulum clamps, the pipe is suspended in a pendulum clamp, which is turnably connected via an intermediate yoke with a housing. The housing is vertically adjustable in a doweled threaded pin. These pendulum clamps are limited with respect to adjustment in height and can be used only for hanging objects close to the wall.

Plastic bands have been used as hangers, and they have been clamped fast in a hanger member by means of fastening screws. This type of pipe suspension can be used only for light-weight pipes, since upon vertical adjustment of the pipes, and particularly for setting a pipe at a higher level, the pipe must be raised in order to be able to shift the hanger.

With another known hanger for pipes, or the like, and particularly for soil pipes and heating pipes, a device is provided for adjusting the length of the hanger. For the adjustment of the length of the band material which, at least in part, forms the hanger, the band is windable and unwindable at one end onto a rotation member. The rotation member is developed as a bolt or a hose clamp. To clamp the member fast, the rotation bolt is tightened by a nut, whereby forcelocked rotation lock is obtained. This rotation lock is, however, unsuitable for heavy weights and the setting of a specific position is difficult. It is furthermore not foolproof since the locking force depends, to a great extent, on the effectiveness of the installation personnel.

SUMMARY OF THE INVENTION

The object of the present invention is to create a hanger device which is simple in construction, cheap to manufacture, foolproof to use and which can be adjusted by the application of small forces.

Another object of the invention is to make unlocking of the roll on which the hanger is wound quite easy and to do such unlocking by application of minimal force.

The invention concerns a hanger device. The roll of the hanger device is nonshiftable in the axial and radial directions. The hanger device includes a lock which is movable vertically with respect to the housing of the device. Actually, the lock is shiftable off the roll and is so placed as to be moved back against the roll to lock the roll under the force of gravity. To lock the roll, the lock falls under its own weight into a positive locking position. This hanger device can be unlocked by simply lifting the lock, which may weigh merely a few grams. This frees the roll to rotate. Thereupon the suspended pipe can be raised or lowered by rotating the roll. This makes it possible, for instance, to lower a heavy pipe structure without having to previously lift it in order to first release the lock. The lock fixes the roll against rotation in the housing after the rotative position of the roll has been adjusted.

BRIEF DESCRIPTION OF THE DRAWINGS

Other objects and features of the invention are described below by way of illustration with reference to the drawing, in which.

DESCRIPTION OF THE PREFERRED EMBODIMENTS

Figures 1, 2, 3:
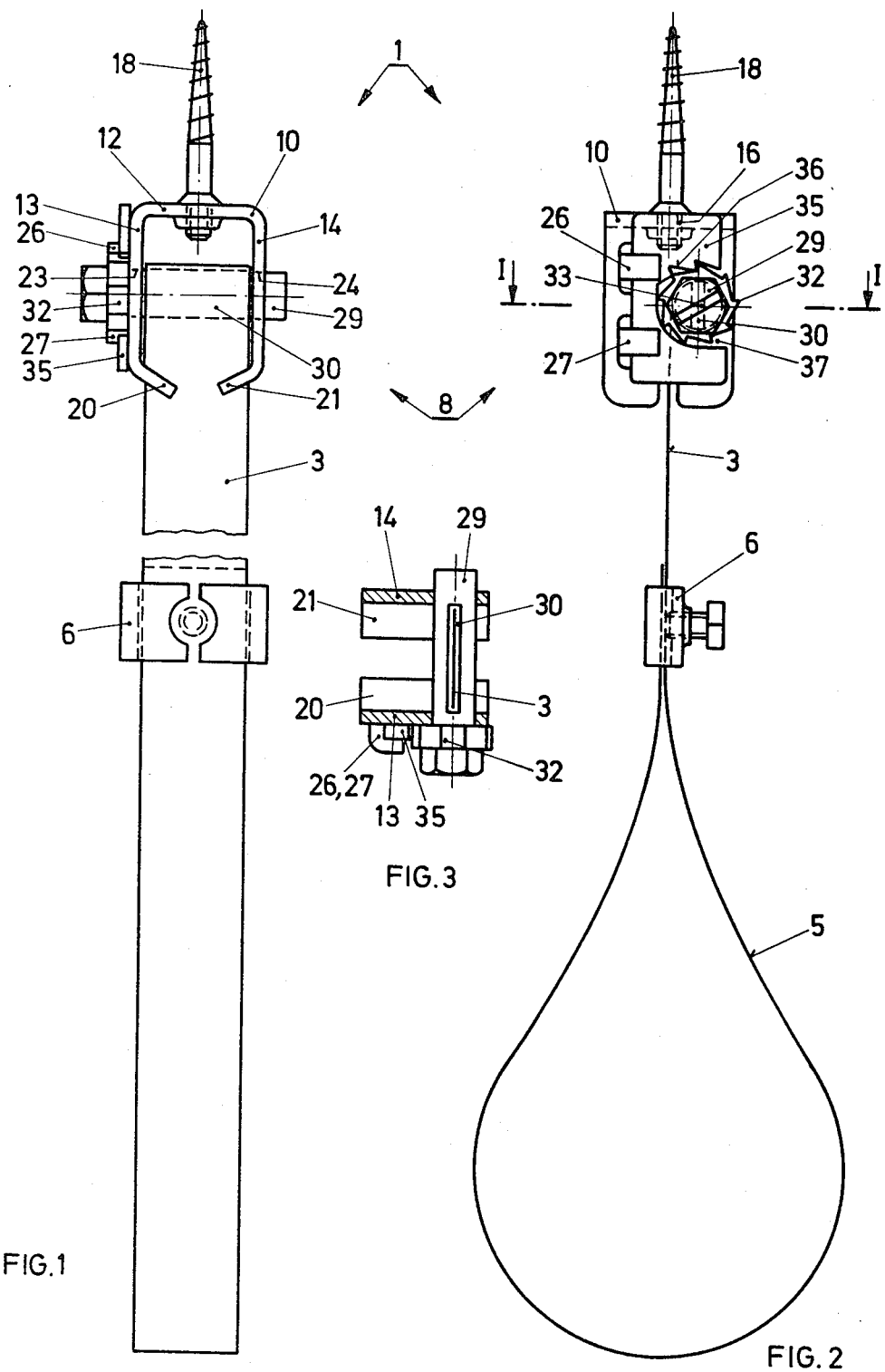
FIG. 1 is a view in elevation of an embodiment of a hanger device according to the invention.
FIG. 2 shows the device of FIG. 1 in side elevation.
FIG. 3 is a section through the device along the line I—I of FIG. 2.

The hanger device 1 shown in FIGS. 1—3 has a wide band pipe hanger 3. At one end, the hanger 3 is wrapped to form a supporting loop 5, and this loop is fixed by a fastener 6. The loop 5 receives the object to be hung, particularly a pipe.

At the upper end of the hanger 3, there is a roll-up device 8. It comprises a housing 10 comprised of an integrally attached top cover part 12 and two spaced apart, opposed side parts 13 and 14, giving the housing 10 a U-shape. The housing 10 is comprised of a single piece and it can be stamped or pressed in a single operation. A threaded hole 16 is formed in the cover part 12 to receive a fastening bolt 18 which serves to attach the hanger device in a fixed position to a support (not shown). In the alternative, it is also possible to screw a support shoe to the cover part 12, instead of using a fastening screw 18, and to thereby develop the hanger device so that it is displaceable along a support rail.

The two side parts 13 and 14 are bent at their bottom free ends to form respective guide lugs 20 and 21 having slots defined in them for guiding and positioning the hanger 3. The side parts 13 and 14 are provided with respective bearing holes 23 and 24 for the below described roll 29. The side part 13 is additionally provided with stamped out guide claws 26 and 27 which extend outside beyond the surface of the side part 13 and slidingly receive the below described locking slide 35.

A hanger wind-up roll 29 is provided. It has a slot 30 defined in it to receive one end of the hanger 3. Instead of a band-shaped hanger 3, a wireshaped hanger can also be used. It would instead be inserted into a corresponding bore hole in the hanger wind up roll. The roll 29 is provided at one axial end portion with a ratchet wheel 32. The ratchet wheel 32 is outside the side part 13. The ratchet wheel 32 is toothed to define first mating means. A roll turning slot 33 is defined on the end surface of the roll 29 for receiving a suitable turning tool, for instance a screwdriver. The roll 29 is comprised of a single part that may be cast.

The lock comprises a locking slide 35 which is comprised of a C-shaped metal plate having a cutout 37 defined in it. The upper edge of the cutout 37 is toothed at 36 to define second mating means. The toothing 36 corresponds to the toothing of the ratchet wheel 32 with which it can mesh.

The roll-up device 8 described above is comprised of three parts 10, 29 and 35, each of which can be produced in a single operation and can be easily installed. During installation, the locking slide 35 is inserted into the two guide claws 26 and 27 outside the housing side part 13. Then the roll 29 is pushed into place through the bearing holes 23, 24 and the cutout 37. The locking slide 35 is thereafter prevented from falling out of the guide claws 26, 27 by the ratchet wheel 32. Next, the hanger 3 is introduced into the slot 30, and the roll 29 is turned until the hanger 3 is secured on the roll 29. The attached hanger 3 now serves to prevent the axial movement of the roll 29 out of the support therefor. The dimensioning of the elements 29, 32, 35, 37 is such that the locking slide 35 can be easily lifted so that the toothing 36 thereof is separated from the toothing of the ratchet wheel 32. The roll 29 can then be turned, by means of a screwdriver inserted in the slot 30. For locking the roll 29 at a particular rotative position, the locking slide 35 is allowed to drop by its own weight under the force of gravity into its lowered position, whereby the toothing 36 comes into engagement with the toothing of the ratchet wheel 32 and the roll 29 is thereafter secured against rotation.

Figure 4:
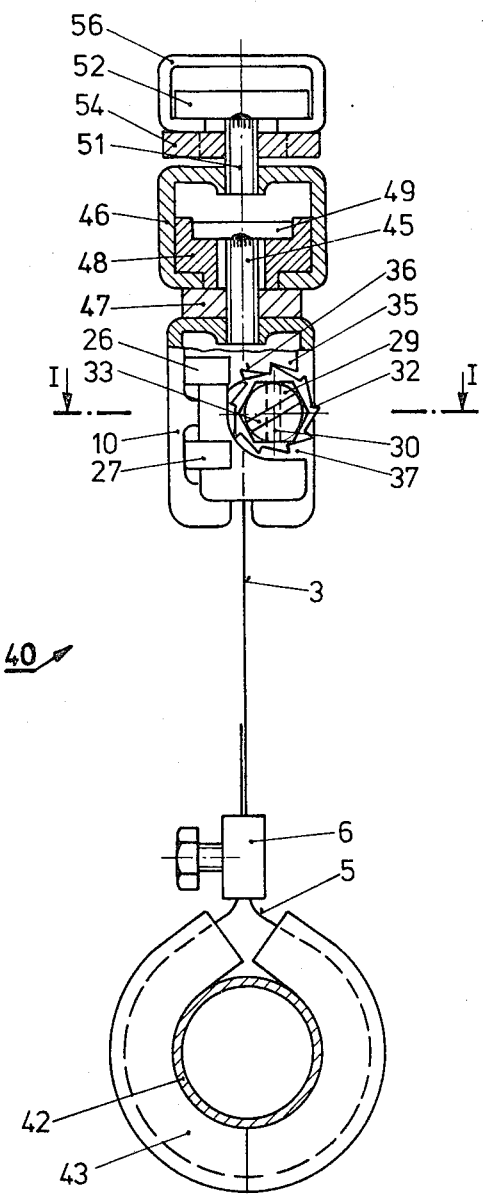
FIG. 4 is an elevational view of another embodiment of a hanger device, similar to that of FIGS. 1 to 3, but with additional heat and sound-insulating elements, in a view similar to that shown in FIG. 2.

FIG. 4 shows an embodiment of a hanger device 40, which is identical in principle to the embodiment of FIGS. 1 to 3, but which is additionally provided with insulation 43 for the pipe 42 which is to be suspended. This insulation may, for instance, be developed in the form of two halves of a cylindrical rubber cuff which are placed around the pipe 42. The insulation 43 is then held in position by the loop 5 of the hanger 3.

At the upper end of the hanger device, acoustic insulation can also be provided. Instead of the fastening bolt 18 of the embodiment of FIGS. 1 to 3, there is a lower threaded bolt 45 having a threaded plate 49 welded to it. The threaded bolt 45 is screwed in the housing 10, and a sound-dampening rubber washer 47, followed by a sound-insulating element 48 arranged in a holder 46 are clamped by the threaded plate 49. An upper threaded bolt 51 is screwed in the cover of the holder 46. The bolt 51 is welded to a slide plate 52 and is provided with a nut 54. The slide plate serves as support for connecting the holder 46 to a Jordal rail 56. The Jordal rail 56 is fastened, for instance, to a bulding ceiling (not shown). The hanger device can then be displaced, with the slide plate 52 riding along the longitudinal direction of the rail 56. At the intended place for bolting the hanger device, the nut 54 is screw tightened against the Jordal rail 56 so that the slide plate 52 and the nut 54 clamp the suspension device fast at the desired place on the Jordal rail.

The embodiment of FIG. 4 has the advantage over the simpler version of FIGS. 1 and 3 that it has heat and sound insulating parts which can also be used with an attachment by means of fastening bolts 18 and can be subsequently mounted without difficulty on existing hanger devices of the construction shown in FIGS. 1 to 3.

Although the present invention has been described in connection with a plurality of preferred embodiments thereof, many variations and modifications will now become apparent to those skilled in the art. It is preferred, therefore, that the present invention be limited, not by the specific disclosure herein, but only by the appended claims.

I claim:

1. A hanger device for pipelines, or the like, comprising:
   a housing for being attached to a support; said housing including a wall;
   a roll onto which a hanger is rollable; said roll being supported by said housing wall for enabling annular rotation of said roll with respect to said housing;
   first mating means on said roll for being engaged to prevent further rotation of said roll;
   a lock; said housing wall including a support thereon for said lock; said support comprising claws pressed out from said housing wall, and said lock being positioned between said claws and said housing wall;
   said lock including second mating means thereon for engaging said first mating means; said claws supporting said lock on said housing for preventing rotation of said lock with said roll with respect to said housing;
   said lock being movable with respect to said claws of said housing wall for bringing said first and said second mating means into and out of engagement; said lock being supported on said housing to be movable with respect to said roll to a position at which said second mating means are separated from said first mating means, and said lock being supported and placed to normally move under its own weight to cause engagement of said first and said second mating means, for thereby halting further rotation of said roll;
   a hanger windable on said roll.

2. The hanger device of claim 1, further comprising means for axially and for radially positioning said roll in said housing while permitting rotation thereof.

3. The hanger device of claim 2, wherein said means for axially positioning said roll comprises said hanger engaging said roll and said hanger extending out of said housing and thereby blocking axial movement of said roll from said housing.

4. The hanger device of claim 1, wherein said first and second mating means comprise respective mutually engageable teeth.

5. The hanger device of claim 1, wherein said first mating means project through said housing wall; said housing wall support being so positioned that said lock is external to said housing, such that said first and said second mating means might engage.

6. The hanger device of claim 1, wherein said lock is generally a plate, said lock shifts through said claws.

7. The hanger device of either of claims 1 or 6, wherein said lock has a cutout therein for creating a generally C-shaped section thereof, and said roller first mating means being in said cutout of said lock.

8. The hanger device of claim 7, wherein said first and said second mating means comprise respective mutually engageable teeth; said teeth of said lock being in said cutout of said lock.

9. The hanger device of claim 1, wherein said hanger includes a suspension support for a pipeline, or the like.

10. The hanger device of claim 9, further comprising insulation in said suspension support for insulating the pipeline, or the like, being supported.

11. The hanger device of claim 10, wherein said suspension support comprises a loop in said hanger, and said insulation being in said loop.

12. The hanger device of either of claims 1 or 10, further comprising acoustic insulating means at said housing in the vicinity of the part thereof to be attached to a support.

13. A hanger device for pipelines, or the like, comprising:
- a housing for being attached to a support;
- a roll onto which a hanger is rollable; said roll being supported by said housing for enabling annular rotation of said roll with respect to said housing;
- first mating means on said roll for being engaged to prevent further rotation of said roll;
- a lock supported on said housing and including second mating means thereon for engaging said first mating means; said lock being supported on said housing for preventing rotation of said lock with said roll with respect to said housing;
- said lock being supported on said housing to be movable generally along a vertical direction and with respect to said roll to a position at which said second mating means are separated from said first mating means, and said lock being supported and placed to normally slide generally along a vertical linear direction under its own weight to cause engagement of said first and said second mating means, for thereby halting further rotation of said roll;
- a hanger windable said roll.

14. The hanger device of claim 13, wherein said first and said second mating means comprise respective mutually engageable teeth.

15. The hanger device of claim 14, wherein said teeth of said lock face downwardly, such that when said lock moves downwardly, said first and said second mating means teeth may engage.

16. The hanger device of claim 15, wherein said lock has a cutout therein for creating a generally C-shaped section thereof, and said foller first mating means being in said cutout of said lock.

* * * * *